No. 885,614. PATENTED APR. 21, 1908.
T. HAND.
NUT LOCK.
APPLICATION FILED JAN. 9, 1908.
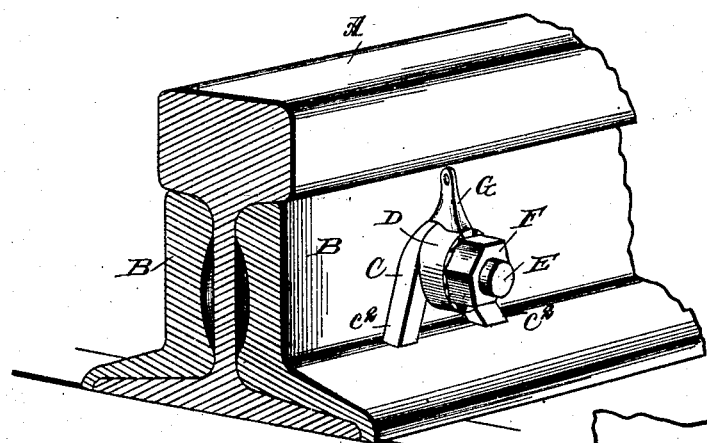
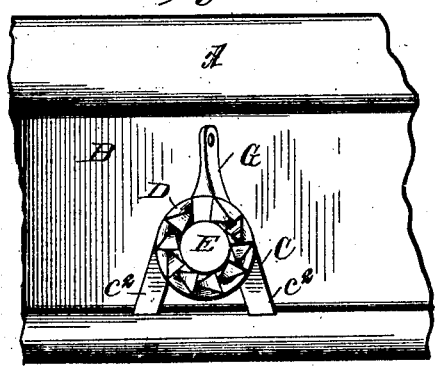
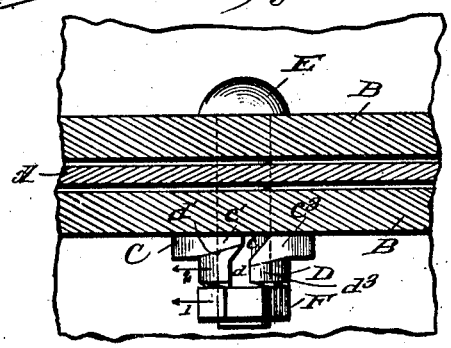
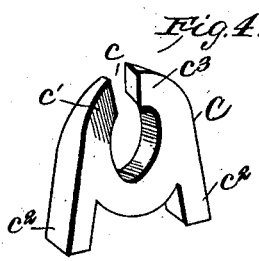
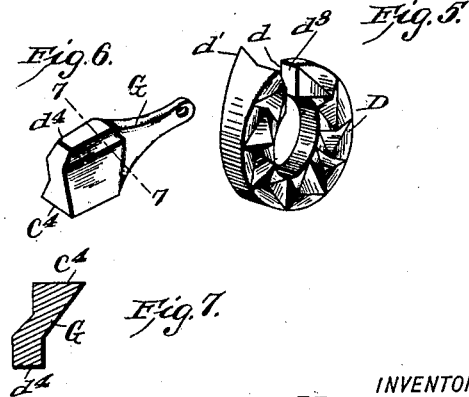
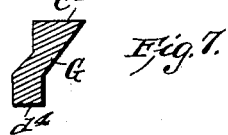
WITNESSES
INVENTOR
TOWNSON HAND
BY
ATTORNEYS

UNITED STATES PATENT OFFICE.

TOWNSON HAND, OF WALLA WALLA, WASHINGTON.

NUT-LOCK.

No. 885,614.  Specification of Letters Patent.  Patented April 21, 1908.

Application filed January 9, 1908. Serial No. 409,932.

*To all whom it may concern:*

Be it known that I, TOWNSON HAND, a citizen of the United States, and a resident of Walla Walla, in the county of Wallawalla and State of Washington, have made certain new and useful Improvements in Nut-Locks, of which the following is a specification.

My invention is in the nature of an improved nut lock designed to prevent the loosening and loss of nuts from their bolts and designed more particularly for securing the nuts upon the bolts of the fish plates of railroad rails, but applicable for all purposes for which a nut lock may be used.
It consists of the novel construction and arrangement of two locking washers arranged to be placed between the nut and the bearing plate and also in the combination therewith of a special form of releasing key for permitting the nut to be conveniently removed.

In the drawing—Figure 1 represents in perspective view, my invention applied to the fish plates of a railroad rail. Fig. 2 is a top plan view with the rail and fish plates in section. Fig. 3 is a side view with the nut removed. Figs. 4 and 5 are detail views in perspective of the two interlocking washers. Fig. 6 is a perspective view of the releasing key, and Fig. 7 is a cross section of the same on the line 7—7 of Fig. 6.

In the drawing A represents the railroad rail, B, B, are the two angular fish plates, which are bolted together on opposite sides of the web of the rail by means of a through bolt E, on the threaded end of which is turned an ordinary nut F. Interposed between the nut F and one of the fish plates is arranged my nut lock, consisting of the two interlocking washers C and D, shown in detail in Figs. 4 and 5. The washer C is of circular form having its upper end bisected at $c$, and having on its lower side two downwardly projecting legs $c^2$, $c^2$. The outer faces of the two adjacent ends of the bisected washer are formed with the inclines $c'$ and $c^3$. The washer C is applied to the plate B over the bolt, as shown in Fig. 1, with its two legs $c^2$, $c^2$ bearing upon the base portion of the plate B, or the base of the rail in case an angular plate is not used. The purpose of these two legs $c^2$ is to prevent, by their bearing contact on the base of the plate, any rotation of the washer C. Fitting against the outer face of the washer C, there is another interlocking washer D which is also bisected at $d$ on its upper side to form two adjacent ends and these ends are formed on their inner faces next to the washer C with inclines $d'$ and $d^3$ adapted to bear against the inclines $c'$ and $c^3$ of the washer C. The outer face of the washer D is provided with a circular series of ratchet teeth as seen in Fig. 5, against which bears the threaded nut F. The trend or incline of these teeth is such as to permit the nut F to be turned on in one direction, but to be engaged and clutched by said teeth during any reverse movement.

When the washer D is applied to the washer C, the slots $c$ and $d$ are arranged in coincidence with each other as seen in Fig. 2, with the inclined face $d'$ of washer D fitting closely against the inclined face $c'$ of washer C, and with the inclined face $d^3$ of washer D fitting against the inclined face $c^3$ of washer C. Now when, with a right hand thread, the nut F is turned on to the screw-threaded end of the bolt in the opposite direction to the arrow 1, it will be seen that the inner face of the nut F jams against the ratchet teeth of the adjacent face of washer D, which teeth become sufficiently buried in the metal of the nut to preclude the backward turn of the nut. Any backward movement of the nut F in the direction of the arrow 1 has a tendency to also rotate backward the washer D in the direction of the arrow 2, but as the inclined faces $d'$ and $d^3$ in such backward movement would be compelled to ride up on the inclined faces $c'$ and $c^3$ of stationary washer C, it will be seen that any turning off tendency of the nut would cause the washer D to be thrust into tighter engagement with the nut F by reason of the fact that the washer C, being held stationary by its legs $c^2$, the washer D must move outwardly in order to turn backward.

It will be seen that the end of the washer D having the incline $d'$ is made heavier than the end carrying the incline $d^3$. The object of this is as follows. If from wear or other cause, the washer D should become loose on the face of washer D against the nut F, in such case the superior gravity of the end $d'$ of washer D will cause it to gradually gravitate to a lower position from the hammering action of the car wheels on the rail and thus permit the washer D to gradually adjust itself to a tighter position by riding outwardly over the inclines $c'$, $c^3$.

By referring to Fig. 2, it will be seen that the slots $c$ and $d$ of the two washers, although in coincidence with each other, are not in axial alinement with the bolt. This permits of longer inclined faces $d'$ and $d^3$, and also enables me to conveniently increase the weight of the end of the washer bearing the incline $d'$.

For greater facility in applying my nut lock and removing the same when desired, I have designed a special form of key G, shown in Fig. 6. This key is made in cross section to exactly correspond to the coinciding slots $c$ and $d$, seen in Fig. 2. The extreme end, however, of this key is made somewhat smaller than its upper portion, whose cross section is shown in Fig. 7. This gives a wedge-shaped action to the key when it is to be inserted into the coinciding slots $c$ and $d$, which compels it to have a tight fit therein. In applying the key G to the juxtaposed washers C and D, the end $d^4$ of the key fits in the slot $d$ of washer D and the end $c^4$ of the key fits in the slot $c$ of the washer C. When this key is inserted into these coinciding slots, as shown in Figs. 1 and 3, it will be seen that the washers C and D are locked together against any movement of the one over the other and consequently the effect of the inclined faces between the same is rendered null and void. When so inserted the nut F may be turned off in the direction of the arrow 1, in Fig. 2, without causing any movement between the inclined faces of the two washers. In like manner, when turning on the nut F this key may be inserted into the coinciding slots $c$ and $d$, so as to hold these slots in proper registration while the nut F is being strongly turned up to its binding position by means of the wrench.

From the foregoing description it will be seen that by means of the two-part nut lock, I am enabled in a simple and practical manner to tightly lock the nut on the bolt, the nut lock is rendered self-tightening in the event of any wear and may be conveniently removed or applied by means of the key G and may be taken off of one bolt and applied to another without any destruction and mutilation.

I claim:

1. A nut lock comprising a two-part washer, both of which are bisected on one side with coinciding slots, arranged out of axial alinement, the inner washer being formed with means for restraining it against turning and having an inclined outer face, and the outer washer being formed with an inclined adjacent face and having on its exterior surface ratchet teeth adapted to be engaged by the adjacent face of the nut.

2. A nut lock comprising a two-part washer, both of which are bisected on one side with coinciding slots, arranged out of axial alinement, the inner washer being formed with means for restraining it against turning and having an inclined outer face, the outer washer being formed with an inclined adjacent face and having on its exterior surface ratchet teeth adapted to be engaged by the adjacent face of the nut, and a detachable key having a cross section corresponding to the shape of the coinciding slots.

3. A nut lock comprising a two-part washer, both bisected on one side with coinciding slots, the inner washer being formed on the outer faces of both its ends with inclines trending in the same direction and the outer washer being formed on its inner face at both its ends with corresponding inclined faces and having on its exterior face ratchet teeth adapted to engage and clutch the nut.

4. A nut lock comprising a two-part washer, both bisected on one side with coinciding slots, the inner washer being formed on the outer faces of both its ends with inclines trending in the same direction, the outer washer being formed on its inner face at both its ends with corresponding inclined faces and having on its exterior face ratchet teeth adapted to engage and clutch the nut, and a key made wedge-shape and corresponding in cross section to the coinciding slots.

TOWNSON HAND.

Witnesses:
  E. D. MATTINSON,
  G W. GRANT.